(12) United States Patent
Hohensee et al.

(10) Patent No.: US 9,778,893 B2
(45) Date of Patent: Oct. 3, 2017

(54) SERVER PRINTER SYNCHRONIZATION FOR JOB TICKET PROCESSING

(71) Applicants: Reinhard Heinrich Hohensee, Boulder, CO (US); Harry Reese Lewis, Longmont, CO (US); Claudia Alimpich, Boulder, CO (US); David E. Stone, Seal Rock, OR (US); Dennis Carney, Louisville, CO (US)

(72) Inventors: Reinhard Heinrich Hohensee, Boulder, CO (US); Harry Reese Lewis, Longmont, CO (US); Claudia Alimpich, Boulder, CO (US); David E. Stone, Seal Rock, OR (US); Dennis Carney, Louisville, CO (US)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 13/625,037

(22) Filed: Sep. 24, 2012

(65) Prior Publication Data
US 2014/0085649 A1    Mar. 27, 2014

(51) Int. Cl.
*G06F 3/12* (2006.01)

(52) U.S. Cl.
CPC .......... *G06F 3/1298* (2013.01); *G06F 3/1205* (2013.01); *G06F 3/1244* (2013.01); *G06F 3/1288* (2013.01); *G06F 3/1209* (2013.01)

(58) Field of Classification Search
CPC ..... G06F 3/1205; G06F 3/1244; G06F 3/1288
USPC ................................ 358/1.1–1.9, 1.11–1.18
See application file for complete search history.

(56) References Cited

U.S. PATENT DOCUMENTS

| | | | |
|---|---|---|---|
| 5,592,683 A * | 1/1997 | Chen .......................... | G06F 3/12 382/309 |
| 2010/0321715 A1* | 12/2010 | Williams .............. | G06F 3/1205 358/1.13 |

* cited by examiner

*Primary Examiner* — Ibrahim Siddo
(74) *Attorney, Agent, or Firm* — Alpine Technology Law Group LLC

(57) ABSTRACT

A method is disclosed including a print controller receiving print job data defined according to a first language, receiving a job ticket defined according to a second language, processing the print job data according to the second language and implementing counters defined according to the first language to track progress while processing the print job data.

20 Claims, 7 Drawing Sheets

SERVER PRINTER SYNCHRONIZATION FOR JOB TICKET PROCESSING

FIELD OF THE INVENTION

The invention relates to the field of printing, and in particular, to job tickets used to direct the processing of a print job.

BACKGROUND

In the field of printing, users desire systems that allow for flexible processing of print jobs. Print jobs typically comprise print data (i.e., the data used to generate a printed output) as well as a job ticket. The job ticket defines processing steps that may be performed for the print job. For example, the job ticket may request that the print data be given a "preflight" analysis before printing in order to check for errors, may request that the printed output be stapled, may define a media or marking material to be used during printing, etc. The processing steps defined by a job ticket may also be referred to as a workflow.

Job tickets may be defined in a number of formats. For example, Job Definition Format (JDF) is a popular Extensible Markup Language (XML) format used for storing job ticket instructions. Similarly, Advanced Function Presentation (AFP) job tickets may be used to define AFP workflows including print data and printer-server communications. While users desire printing systems that are highly interoperable with each other, there remains no way to integrate support for JDF job tickets in AFP architecture. This is unfortunate because users that have a substantial investment in AFP printing systems may not wish to replace their existing production printing equipment in order to utilize workflows defined in JDF.

SUMMARY

In one embodiment, a method is disclosed. The method includes a print controller receiving print job data defined according to a first language, receiving a job ticket defined according to a second language, processing the print job data according to the second language and implementing counters defined according to the first language to track progress while processing the print job data.

In a further embodiment a printer is disclosed including one or more counters defined according to a first language and a print controller. The print controller receives a print job data defined according to the first language, receives a job ticket defined according to a second language, processes the print job data according to the second language and implements the counters to track progress of a print job while processing the print job data.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
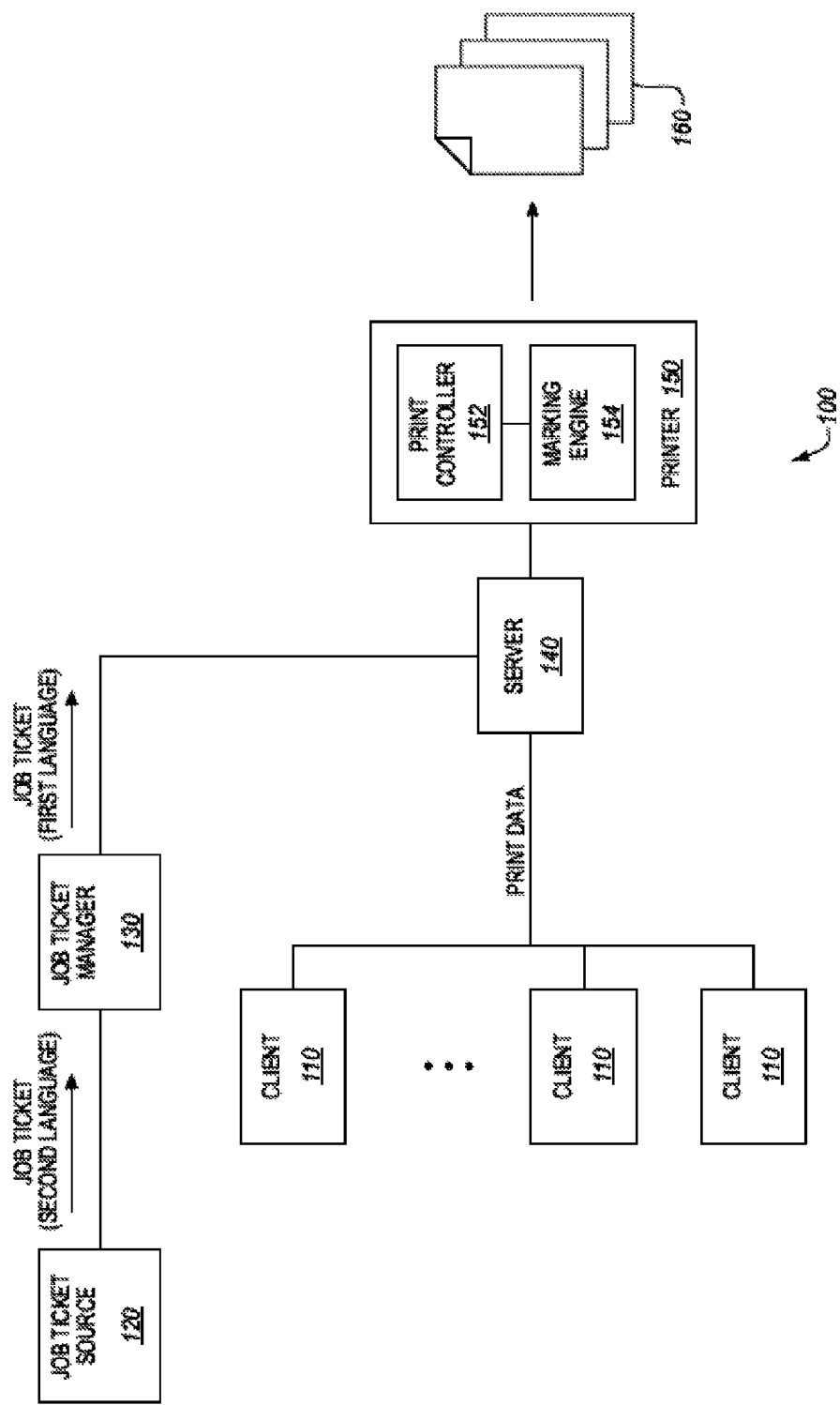
FIG. 1 is a block diagram of one embodiment of a printing system.

FIG. 1 is a block diagram illustrating one embodiment of a printing system 100. Printing system 100 includes any system, device, or component operable to process incoming jobs to generate a printed output. In one embodiment, printing system 100 includes multiple clients 110 operable to communicate print data to a server 140, a job ticket source 120 operable to acquire a job ticket, and a job ticket manager 130.

In such an embodiment, printing system 100 also includes a printer 150 operable to receive print data and job tickets transmitted by server 140, and to generate printed output 160 based upon received print data and job tickets. According to one embodiment, printing system 100 is enhanced in that a job ticket defined according to a first language (e.g., AFP) may be used to wrap job tickets from a source encoded according to a second language (e.g., JDF).

Clients 110 include any systems, components, or devices operable to acquire print data and provide it to server 140 for processing. Typically, clients 110 will each include a workstation having a user interface, a physical display, and a processor operable to manage instructions from a print operator. Thus, by using clients 110, a print operator may submit print data for printing, may trigger the creation of a job ticket, may generate or acquire print data, and may otherwise interact with printing system 100. While multiple clients 110 are depicted with regard to FIG. 1, the number and type of clients 110 may vary as a matter of design choice.

Job ticket source 120 and job ticket manager 130 are operable together to acquire a first job ticket defined according to a first language and to wrap a second job ticket defined according to a second language within the first job ticket.

Job ticket source 120 includes any system, component, or device operable to acquire a job ticket defined according to a second language. For example, job ticket source 120 may be capable of generating JDF job tickets based upon print job processing requests submitted via one or more clients 110. These processing requests may indicate a predefined set of workflow actions to perform upon the print job, or may define a customized series of actions to perform upon the print job. Job ticket source 120 may be further operable to acquire job tickets stored in a (remote or local) memory. While job ticket source 120 is depicted as separate from clients 110, in one embodiment each client 110 may include a job ticket source 120 capable of generating job tickets.

Job ticket manager 130 includes any system, component, or device operable to wrap a job ticket received from job ticket source 120 within a job ticket defined according to a first language. For example, job ticket manager 130 may encapsulate received JDF job tickets within an AFP job ticket. While job ticket manager 130 is depicted as separate from clients 110, in one embodiment each client 110 may include a job ticket manager 130 capable of encapsulating received job tickets.

In one embodiment, a client 110 includes both job ticket source 120 and job ticket manager 130. Such a client 110 may further comprise enhanced interfaces for user interaction and communication with server 140. In further embodiments, the client 110 may include a memory for accessing print data and/or stored job tickets for printing system 100.

Server 140 includes any system, component, or device operable to manage the operations of printing system 100. According to one embodiment, server 140 is operable to receive print data and job tickets associated with the print data in order to form a complete print job. In embodiments where server 140 is AFP-compliant, server 140 may process AFP print files and received AFP job tickets in order to generate a stream of Intelligent Printer Data Stream (IPDS) messages for transmission to printer 150.

In a typical AFP workflow process, server 140 receives an AFP job ticket including multiple Medium Maps, wherein each Medium Map includes a number of AFP instructions for processing a group of pages of an AFP print file. Server 140 then processes the AFP instructions of a Medium Map and the group of pages in the AFP print file indicated by the Medium Map to generate a stream of IPDS communications. In situations where only one Medium Map is included, that Medium Map may include instructions for all of the pages of the AFP print file.

When an AFP job ticket is received that encapsulates a job ticket defined according to another language, server 140 may detect the container encapsulating the job ticket, and may process the container in order to extract the container from the AFP job ticket and submit the encapsulated job ticket to printer 150. For example, if the encapsulated job ticket is included within an Object Container Data portion of a Medium Map, the encapsulated job ticket may be placed, in encapsulated form, within an IPDS communication for transmission to printer 150 in an unaltered format.

Printer 150 includes any system, component, or device operable to generate a printed output based upon data received from server 140. In this embodiment, printer 150 includes print controller 152 and marking engine 154. Print controller 152 is operable to process print data in order to generate rasterized content for marking engine 154. Furthermore, print controller 152 is operable to receive an encapsulated job ticket, to identify the language of the encapsulated job ticket, and to extract the encapsulated job ticket in order to direct processing of the print data. Thus, print controller 152 includes logic for processing job tickets defined according to the language of the encapsulated job ticket. For example, if the job ticket defines a media for the print data (e.g., a size, weight, sheen, etc. of the media), print controller 152 may alter the way in which the print data is rasterized in order to ensure a desirable output (i.e., glossy paper may use a different rasterized version of the data than regular paper, because ink is retained on the paper differently). In further embodiments, print controller 152 may be separate from or integral with printer 150.

Marking engine 154 includes any system, component, or device operable to generate a printed output based upon received data from print controller 152. Marking engine 154 may utilize a marking material such as toner or ink in order to mark media, or may include components operable to emboss or cut out portions of media in order to generate a printed output. Marking engine 154 may utilize a number of trays to source its media, or may utilize rolls of continuous-form printing media.

Further details of the operation of printing system 100 will be discussed with regard to FIG. 2. Assume, for this embodiment, that a print operator at client 110 desires to generate a print job and submit it for printing.

Figure 2:
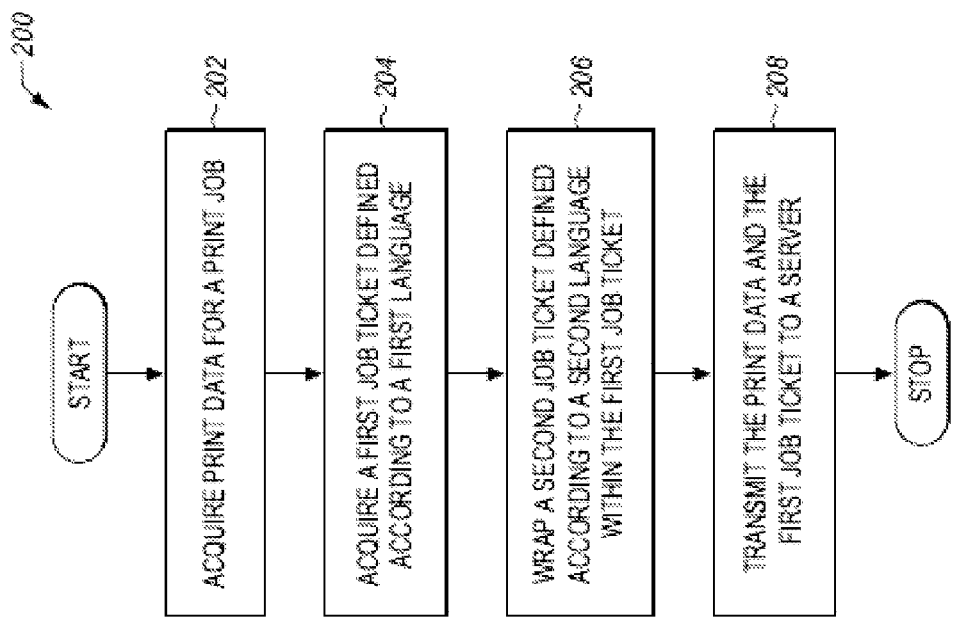
FIG. 2 is a flowchart illustrating one embodiment of a process for wrapping a job ticket in a job ticket defined according to another language in an exemplary.

FIG. 2 is a flowchart illustrating a method 200 for wrapping a job ticket in a job ticket defined according to another language in an exemplary embodiment. The processes of method 200 are described with reference to printing system 100 of FIG. 1, but those skilled in the art will appreciate that method 200 may be performed in other systems. The processes of the flowcharts described herein are not all inclusive and may include other processes not shown. The processes described herein may also be performed in an alternative order.

In processing block 202, a client 110 of printing system 100 acquires print data for a print job. The print data may be defined, for example, according to a Page Description Language (PDL). The print data may be generated at client 110, or may be selected via client 110 for printing. In addition, client 110 may acquire or generate print job processing requests indicating a workflow of operations requested to be performed upon the print job. These operations may include, for example, sorting pages of the printed document, hole-punching the printed document, selecting a media for printing the document, etc.

In processing block 204, job ticket manager 130 acquires a first job ticket defined according to a first language (e.g., the job ticket may be an AFP job ticket). For example, the first job ticket may be acquired from job ticket source 120. In one embodiment, acquiring the first job ticket involves generating the first job ticket at job ticket manager 130. This first job ticket may comprise instructions indicated in the print processing requests, or may be a "dummy" job ticket that includes no content for managing the workflow of the print job, and is merely intended to wrap another job ticket.

Further, job ticket manager 130 receives a second job ticket defined according to a second language (e.g., JDF) from job ticket source 120. In one embodiment, job ticket source 120 receives input from a client 110, and retrieves the second job ticket from memory based upon the input. The second job ticket includes instructions for processing the print job, and may, for example, reflect print job processing requests indicated in processing block 202 described above.

In processing block 206, job ticket manager 130 wraps the second job ticket within the first job ticket. A number of different techniques may be utilized to wrap the second job ticket within the first job ticket, but the instructions (e.g., the specific commands) of the second job ticket are not translated into another language or otherwise modified during the process. For example, the second job ticket may be placed, in whole, within a comment or other portion of the first job ticket that will not be processed by server 140. If the first job ticket is an AFP Form Map, such a portion may be a container such as an Object Container structure of a Medium Map. In a further embodiment, the second job ticket may be wrapped within the first by attaching the second job ticket to a metadata structure of the first job ticket.

In processing block 208, client 110 transmits the print data and job ticket manager 130 transmits the first job ticket to server 140. Within the first job ticket, the contents of the second job ticket remain in an unaltered form. Server 140 receives the print data and the first job ticket, and may analyze the first job ticket to identify the second job ticket wrapped within. For example, identifying the second job ticket may comprise identifying an Object Container that includes an Object Container Data (OCD) structure that stores the second job ticket. Identifying the second job ticket may further include parsing a Begin Object Container (BOC) structure of the Object Container indicating that the second job ticket is stored within. In one embodiment, identifying may further comprise reviewing the BOC of the Object Container for a tag that identifies the language of the second job ticket. In this manner, server 140 may select a printer for processing the print job that is capable of interpreting the second job ticket language.

Server 140 subsequently extracts the second job ticket from the first job ticket. This may include retrieving an Object Container Data (OCD) structure from an Object Container of the first job ticket that includes the second job ticket, and placing the contents of the Object Container Data (OCD) structure within a corresponding object container in an IPDS communication. Next, server 140 transmits the print data to print controller 152 for printing, and transmits the second job ticket (e.g., within the IPDS command) to print controller 152 for processing.

Print controller 152 receives the print data for processing, and also receives a communication that encapsulates the second job ticket. Print controller 152 then analyzes the communication to identify the second job ticket, and extracts the second job ticket from the communication.

Print controller 152 includes logic for processing job tickets encoded in the first language (e.g., AFP) as well as job tickets encoded in the second language (e.g., JDF). Thus, upon detecting that the job ticket is encoded according to the second language, print controller 152 is operable to process received data in accordance with the instructions of the second job ticket.

Using method 200 of FIG. 2, print operators may advantageously utilize JDF job tickets in order to generate and manage workflows for AFP print jobs. This allows the print operator to utilize a wider variety of workflow generation tools than normally supported by AFP systems.

In a further embodiment, the second job ticket may be a JDF job ticket, and may be broken into multiple segments by job ticket source 120 or job ticket manager 130. Each segment may relate to a group of pages of the print job, and each segment may include a separate set of JDF instructions. Furthermore, each segment may be placed within a different AFP Medium Map, such that the JDF instructions may be processed segment-by-segment by print controller 152 in order to generate a printed output. In such embodiments, each segment may include a complete and independent JDF job ticket for its associated group of pages. Alternatively, the entire JDF job ticket may be placed into an AFP Medium Map (e.g., the first medium map for the print job) so that print controller 152 may process the entire job ticket at once, and apply relevant instructions from the job ticket to relevant pages of the print data.

Each Medium Map applies to the pages that follow until another Medium Map is invoked, or until the end of the document is reached. Thus, upon processing each Medium Map, server 140 may acquire the appropriate JDF job ticket segments, and may further transmit these segments so that they are received by print controller 152 with time to process the JDF instructions and to apply the instructions to the print data.

In a further embodiment, Medium Maps including AFP instructions may be interspersed with Medium Maps including wrapped JDF instructions. Each Medium Map may be associated with a different group of pages. In this manner, server 140 may process each Medium Map (and associated group of pages) as desired. For example, server 140 may process a first Medium Map including AFP instructions in order to generate IPDS communications directing the operations of printer 150 in processing a group of pages. Server 140 may then process a second Medium Map including JDF instructions, and the JDF instructions may be sent to printer 150 for processing in an IPDS communication, along with print data for another group of pages. Printer 150 may then use a digital front end capable of processing the JDF commands in order to engage in processing the JDF instructions and applying them to the print data. Thus, in this embodiment, server 140 manages the application of AFP instructions to the print data, while printer 150 receives and applies JDF instructions to the print data.

EXAMPLES

In the following examples, additional processes, systems, and methods are described in the context of a printing system capable of handling AFP print jobs having workflows defined in JDF. In these examples, exemplary details of packaging a JDF job ticket within an AFP job ticket (i.e., an AFP Form Map) for later processing will be discussed.

Figure 3:
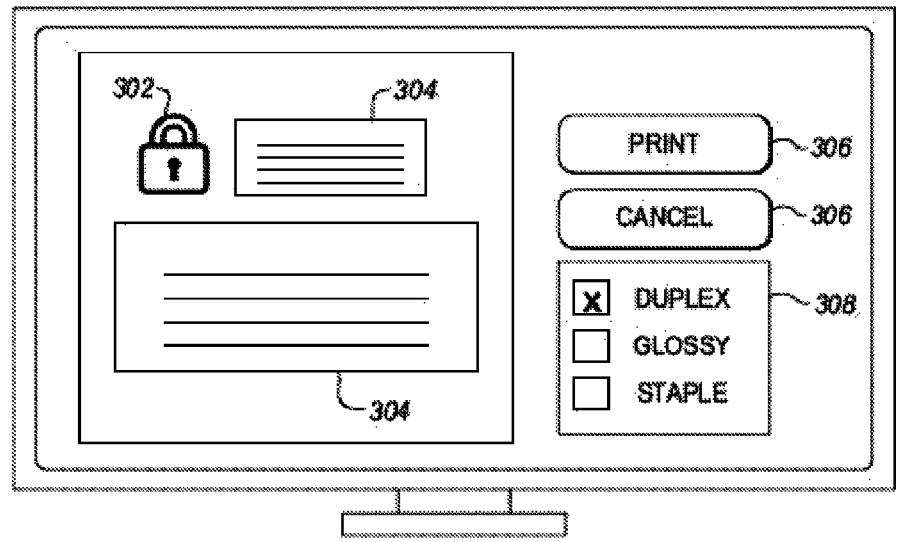
FIG. 3 is a block diagram illustrating one embodiment of a user generating a print job.

FIG. 3 is a block diagram illustrating a user generating a print job defined by a JDF workflow in an exemplary embodiment. According to FIG. 3, a user operating through a user interface of a client has been provided with a print preview of a document that they wish to print. The document includes one or more graphic elements 302 as well as one or more textual elements 304. These components include a portion of the print data for the print job. While the print data appears in rasterized form at the display of FIG. 3, a person having ordinary skill in the art will appreciate that the print data may be stored in a variety of formats that are not necessarily rasterized (e.g., PDL, etc.).

The user may utilize buttons 306 in order to schedule the print job for printing or to cancel printing of the job. Furthermore, the user may indicate a number of job processing options 308 which may alter the way that the print job is preprocessed, printed, or processed after printing. For example, in FIG. 3 the user has selected a glossy media to use for printing, which may alter the way in which raster data is generated for the print job when compared with regular media.

FIG. 3 has been greatly simplified for the purposes of this discussion. In a typical production printing environment, dedicated and advanced programs will be used to perform each of previewing one or more print jobs, scheduling one or more print jobs for printing/processing at various components of the print shop, and generating job tickets indicating workflows for print jobs.

Figure 4:
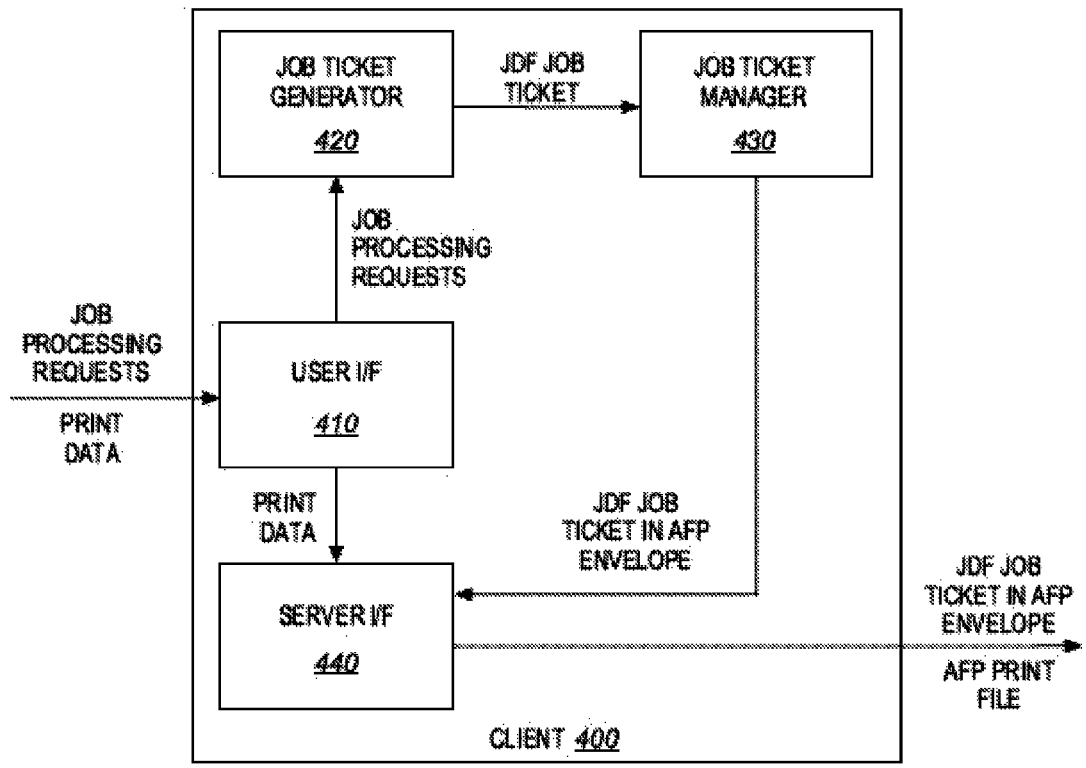
FIG. 4 is a block diagram illustrating one embodiment of a client packaging a JDF job ticket within an AFP job ticket.

FIG. 4 is a block diagram of a client 400 packaging a JDF job ticket within an AFP job ticket (i.e., an AFP Form Map) in an exemplary embodiment. According to FIG. 4, client 400 receives one or more print job processing requests defining a workflow at user I/F 410, and also receives print data for a print job. Upon receiving the print data, client 400 may store the print data in a memory or buffer for transmission to a server via server I/F 440, may transmit the print data directly to a server, or may process the print data to generate an AFP print file.

Figure 5:
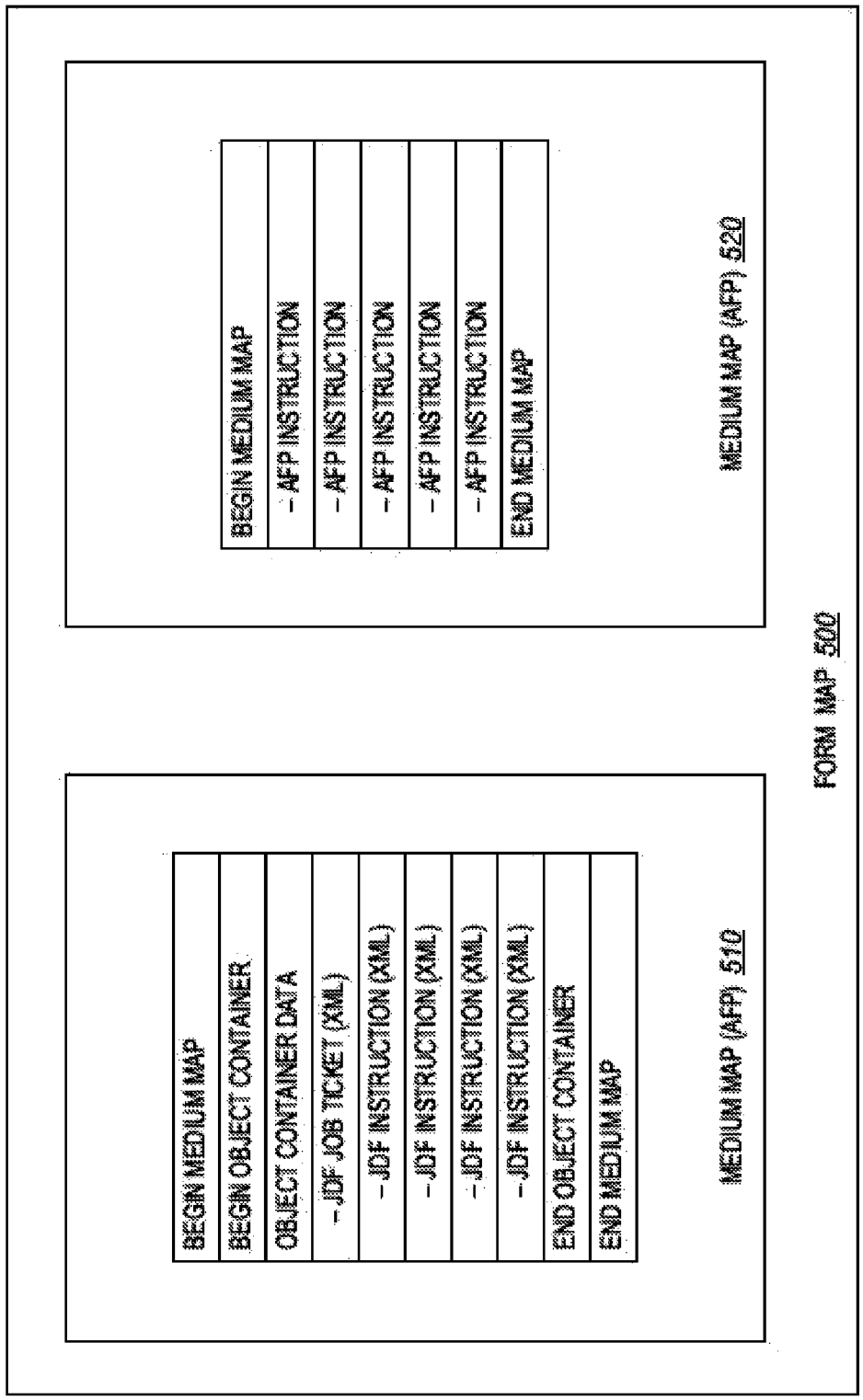
FIG. 5 is a block diagram of illustrating one embodiment of an AFP Form Map that includes a Medium Map having AFP commands as well as a Medium Map having a JDF job ticket.

Upon receiving the job processing requests, job ticket generator 420 may generate one or more JDF commands within a JDF job ticket that may be performed in order to accomplish the job processing requests. The JDF job ticket is passed to job ticket manager 430, which generates an empty AFP Form Map including a Medium Map having an Object Container structure. The JDF job ticket is then inserted into the Object Container structure for transmission. Client 400 may further transmit the JDF job ticket (within the AFP envelope) as well as the print data to a server for processing. FIG. 5 further discusses exemplary implementations of AFP Form Maps that include JDF job ticket instructions.

FIG. 5 is a block diagram of an AFP Form Map 500 that includes a Medium Map having AFP job ticket instructions as well as a Medium Map having JDF job ticket instructions in an exemplary embodiment. FIG. 5 illustrates a scenario where some workflow instructions are kept in AFP format, while other workflow instructions are kept in a JDF format.

In this embodiment, Form Map 500 includes Medium Map 510 as well as Medium Map 520. Medium Map 510 includes an Object Container, which itself includes a Begin Object Container instruction, Object Container Data (OCD), and an End Object Container instruction. Within the OCD, the JDF job ticket is preserved in its native XML JDF format. Thus, no translation or other alteration of the format of the XML JDF instructions has occurred.

At the same time, Medium Map 520 includes a number of AFP job ticket instructions for processing the print job. As each AFP Medium Map relates to a different group of pages, a print controller may utilize Medium Map 510 to process a first group of pages according to the JDF instructions, while a server may utilize Medium Map 520 to process a second group of pages according to the AFP instructions, and then transmit those pages to the print controller for printing.

Figure 6:
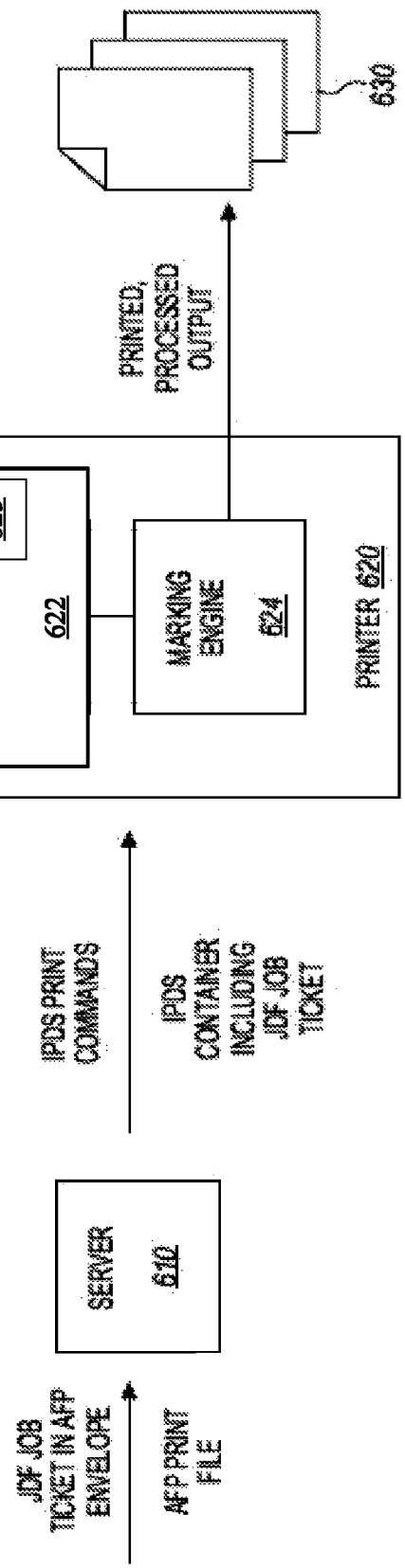
FIG. 6 is a block diagram illustrating one embodiment of processing of job ticket wrapped within another job ticket in order to generate a printed output in an exemplary embodiment.

FIG. 6 is a block diagram illustrating processing of a JDF job ticket wrapped within an AFP job ticket (i.e., an AFP Form Map) in order to generate a printed output in an exemplary embodiment. According to FIG. 6, a server 610 receives a JDF job ticket in an AFP envelope, as well as an AFP print file. Server 610 processes the AFP envelope and detects a Medium Map relating to the pages of the received print data. Therefore, server 610 initiates processing of the Medium Map.

The Medium Map does not include AFP job ticket instructions, but does include an Object Container structure that holds the JDF job ticket. Server 610 processes the Medium Map to generate an IPDS communication, and the IPDS communication includes a container for holding the Object Container structure (i.e., the wrapped JDF instructions). Server 610 transmits the IPDS container along with IPDS print commands for the print data, which are received by print controller 622 of printer 620.

Print controller 622 receives the IPDS container and identifies the JDF job ticket included within. Therefore, print controller 622 extracts the JDF job ticket and initiates processing of the JDF job ticket. The JDF processing capabilities of print controller 622 have been enhanced to handle the processing of JDF job tickets for sequential streams of pages provided via IPDS. Thus, based upon the JDF job ticket instructions, print controller 622 adjusts the manner in which it processes the incoming IPDS print commands and pages. The processed IPDS print commands and pages are then sent to marking engine 624, which generates printed output 630 representing a printed version of the job.

Specifically, while processing a JDF job ticket, print controller 622 enters a job ticket mode, wherein the JDF instructions are applied to each received page of print data. This proceeds until another JDF job ticket is received, or until an IPDS command is received at print controller 622 that overrides current job ticket instructions. While processing job ticket instructions, it may be desirable to identify the page number of each incoming page of print data. Thus, in order to determine the page number for received pages, print controller 622 acquires a page ID from a Begin Page command of each page. Thus, print controller 622 may manage the actions of marking engine 624 in order to generate a printed output while utilizing native-format JDF commands.

Synchronization

In order to provide customer features, such as printing error recovery and printer activity accounting records, synchronization must be maintained between server 610 and print controller 622. In order to facilitate such synchronization, print controller 622 includes counters 625 that mark important places in the logical paper path. Thus, the data stored in counters 625 is transmitted back to server 610 so that server 610 is aware of what is occurring at printer 620.

Counters 625 include a received page counter that is incremented by 1 each time an IPDS page is received and syntax checked by printer 620, and a committed page counter that is incremented by the number of IPDS pages on a sheet each time a non-blank sheet is committed for printing (e.g., the pages might not actually be on paper yet). In one embodiment, server 610 can no longer discard pages that have been committed for printing.

Counters 625 also include a jam recovery page counter that is incremented by the number of IPDS pages on a sheet each time a sheet has passed the last point in the paper path where a jam may occur, and a stacked page counter that is incremented by the number of IPDS pages on a sheet each time a sheet is stacked. In one embodiment, printer 620 is finished with pages that have reached this point.

As discussed above, print controller 622 receives and processes a complete JDF job ticket, while print server 610 continues to stream pages without opening or processing the job ticket. For simple printing applications (e.g., when the JDF requests only a single copy of a file, prints all pages, and does not generate inserts) printer 620 can update page and copy counters as usual. Thus, server 610 can stay in sync with printer 620 for page-level error recovery and accounting based on these counters. However, in embodiments in which a JDF job ticket requests multiple file copies, a partial print of the file, or causes printer 620 to generate inserts, the "traditional" IPDS counter definition is no longer sufficient to keep the server and printer in sync.

According to one embodiment, printer 620 expands the definition of counters 625 to operate in a job ticket mode to enable tracking of JDF controlled print jobs. In such an embodiment, counters 625 are updated upon printer 620 completion of page processing (e.g., JDF job ticket instructions for a page having been satisfied), in addition to when a page has been moved past a counter point. For instance, if a JDF only prints two pages (e.g., pages 3 and 5) of a 100 page file.

In such instance, the stacked page counter shows that 100 pages were "stacked/processed" once printer 620 has completed processing the JDF against the file, thus enabling server 610 to stay in sync with printer 620 as pages are printed/processed. In one embodiment, pages inserted by instructions from the job ticket are not counted in the counters 625, but may be reported after the job is completed.

According to one embodiment, each Object Container structure (e.g., wrapped JDF instruction) is associated with an Object Identifier (OID). The OID enables the association of page counters with specific JDFs. Thus, each JDF job ticket included with a stream of files received from server 610 at printer controller 622 includes an OID. In one embodiment, each OID is calculated by algorithms that used for TrueType fonts and Color Management Resources.

In one embodiment, printer controller 620 updates server 610 via a file complete indication when operating in the job ticket mode. In such an embodiment, printer 620 generates the file copy complete indication for server 610 along with a snapshot of all the counters at that point in time upon completion of processing a JDF job ticket against a stream of pages (e.g., a print file).

In a further embodiment, server 610 requests a report from printer 620 after all file copies for a job are complete via an "Obtain Job-Ticket Results" command. In such an embodiment, the Obtain Job-Ticket Results command is an ACK-request command that returns the Object OID for a JDF job-ticket object plus information about the printing of the job.

In yet a further embodiment, the file-copy complete indication provides information, such as a number of physical sheets actually stacked for each file copy and a list of inserted sheets. In this embodiment, each list entry includes an IPDS page-counter value for the page after the inserts, and a number of inserted sheets. The file-copy complete indication may be accomplished via a condition-requiring-host-notification exception ID returned by printer 620 in an IPDS NACK. In such an embodiment, the NACK is issued before printer 620 bumps the stacked page counter for the last page of the file copy. However, a subsequent ACK request shows the last page to be stacked. The NACK identifies which copy is complete and how many total copies are to be printed.

Figure 7:
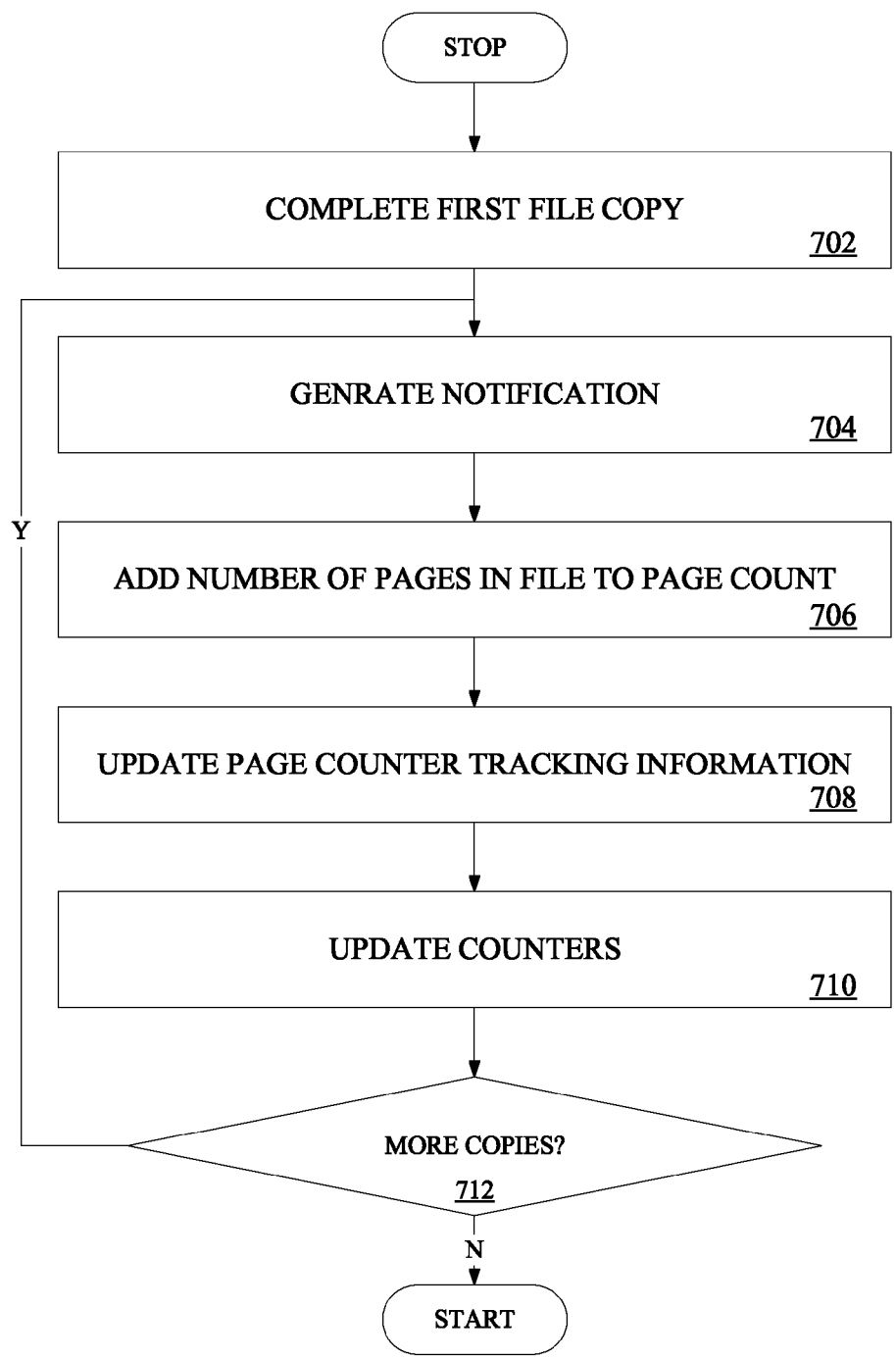
FIG. 7 is a flowchart illustrating one embodiment of a process for providing multiple file copies.

In one embodiment, printer 620 also maintains synchronization between server 610 and printer 620 during multiple JDF generated copies of a file. FIG. 7 illustrates one embodiment of a process for maintaining synchronization during the printing of multiple file copies. At processing block 702, the first file is completed. At processing block 704, printer 620 generates a notification to indicate to server 610 that a file copy has been completed and that an additional file copy will be printed next.

At processing block 706, printer 620 adds the number of pages in the file to the received page count as if another copy of the file had received from server 610. Server 610 subsequently reflects these additional pages in its page-counter-tracking information, processing block 708. At processing block 710, the other counters are updated as pages progress through the pipeline.

At decision block 712, there is a determination as to whether another file copy is to be made. If so, control is returned to processing block 704 for generation of another notification. Otherwise, the process has been completed. Upon the notification of the last file copy, no additional values are added to the received page count; at this time, the server may issue an Obtain Job-Ticket Results command to gather information about the printing of the job.

In some cases, printer 620 must issue a NACK, but does not need to adjust page counters or require the host to resend pages. For example, during printing of multiple file copies, printer 620 keeps all of the pages for the first file copy until all file copies are complete. Therefore when a paper jam occurs when printing a subsequent file copy, the jam is reported without printer 620 needing the pages resent. According to one embodiment, a notification action code is defined that does not cause counter adjustments, while directing server 610 to continue normally without necessarily repositioning. The action code is used for NACKs, such as paper jam within a file copy, where repositioning is not required (but normally would cause repositioning). In a further embodiment, the action code is also used for the new file-copy complete NACK.

Figure 8:
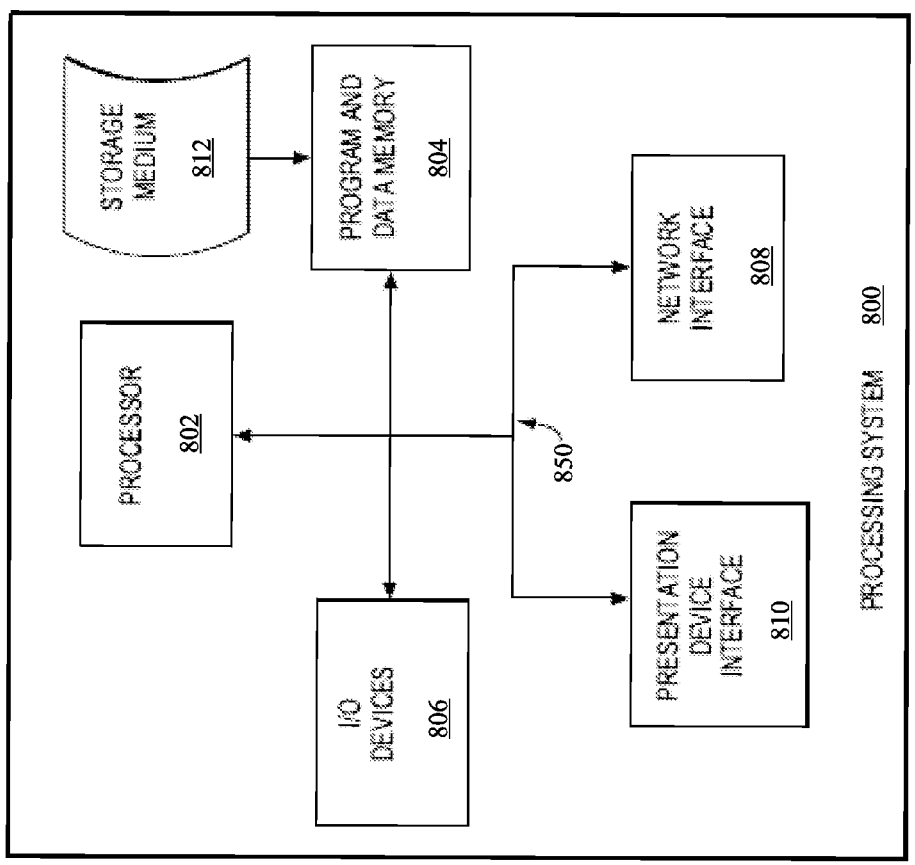
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 8 illustrates a processing system 800 operable to execute a computer readable medium embodying programmed instructions to perform desired functions in an exemplary embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   a print controller receiving print job data defined according to a first language;
   receiving a second job ticket having instructions defined in a second language;
   generating a first job ticket having instructions defined in the first language;
   encapsulating the second job ticket within the first job ticket;
   processing the print job data according to the first language based on instructions included in the second job ticket; and
   implementing counters defined according to the first language to track progress while processing the print job data based on the second job ticket instructions, wherein the counters are updated upon completion of print processing of a page according to the second language.

2. The method of claim 1 wherein implementing the counters to track progress comprises re-defining the counters to track pages that have been processed according to the first job ticket instructions without physically progressing through the print controller.

3. The method of claim 2 further comprising synchronizing with a server according to the first language by transmitting a status of the counters to the server.

4. The method of claim 3 wherein the status of the counters is transmitted to the server as a component of a file copy complete indication.

5. The method of claim 4 wherein the file copy complete indication includes a number of physical sheets actually stacked for each file copy and a list of inserted sheets.

6. The method of claim 4 wherein the file copy complete indication is transmitted in response to receiving a command from the server.

7. The method of claim 3 wherein synchronization with the server is maintained during generation of multiple copies of the print job.

8. The method of claim 7 further comprising:
   completing processing of the print job;
   generating a notification indicating that a second copy of the print job is to be printed;
   adding the number of pages in the print job to a received page count; and
   updating additional counters.

9. The method of claim 8 further comprising:
   determining if a subsequent copy of the print job is to be made after completing processing of the second copy of the print job;
   generating a second notification indicating that the subsequent copy is to be printed;
   adding the number of pages in the print job to the received page count; and
   updating the additional counters.

10. The method of claim 2 further comprising generating a notification action code indicating to the server that an action is occurring that does not require action by the server.

11. A printer comprising:
    one or more counters defined according to a first language; and
    a print controller to receive print job data defined according to a first language, receive a second job ticket having instructions defined in a second language; generate a first job ticket having instructions defined in the first language; encapsulate the second job ticket within the first job ticket, process the print job data according to the first language based on instructions included in the second job ticket, and implement counters defined according to the first language to track progress while processing the print job data based on the second job ticket instructions, wherein the counters are updated upon completion of print processing of a page according to the second job ticket.

12. The printer of claim 11 wherein the print controller synchronizes with a server according to the first language by transmitting a file copy complete indication to the server to indicate a status of the counters.

13. The printer of claim 12 wherein the file copy complete indication includes a number of physical sheets actually stacked for each file copy and a list of inserted sheets.

14. The printer of claim 13 wherein the file copy complete indication is transmitted in response to receiving a command from the server.

15. The printer of claim 12 wherein synchronization with the server is maintained during generation of multiple copies of the print job by completing processing of the print job, generating a notification indicating that a second copy of the print job is to be printed, adding the number of pages in the print job to a received page count and updating additional counters.

16. The printer of claim 12 further wherein the print controller generates a notification action code indicating to the server that an action is occurring that does not require action by the server.

17. A system comprising:
    a print server; and
    a printer, including:
      one or more counters defined according to a first language; and a print controller to receive print job data defined according to a first language, receive a second job ticket having instructions defined in a second language; generate a first job ticket having instructions defined in the first language; encapsulate the second job ticket within the first job ticket, process the print job data according to the first language based on instructions included in the second job ticket, and implement counters defined according to the first language to track progress while processing the print job data based on the second job ticket instructions, wherein the counters are updated upon completion of print processing of a page according to the second job ticket.

18. The printer of claim 17 wherein the file copy complete indication includes a number of physical sheets actually stacked for each file copy and a list of inserted sheets.

19. The printer of claim 18 wherein the file copy complete indication is transmitted in response to receiving a command from the server.

20. The printer of claim 17 wherein synchronization with the server is maintained during generation of multiple copies of the print job by completing processing of the print job, generating a notification indicating that a second copy of the print job is to be printed, adding the number of pages in the print job to a received page count and updating additional counters.

* * * * *